Patented Apr. 10, 1928.

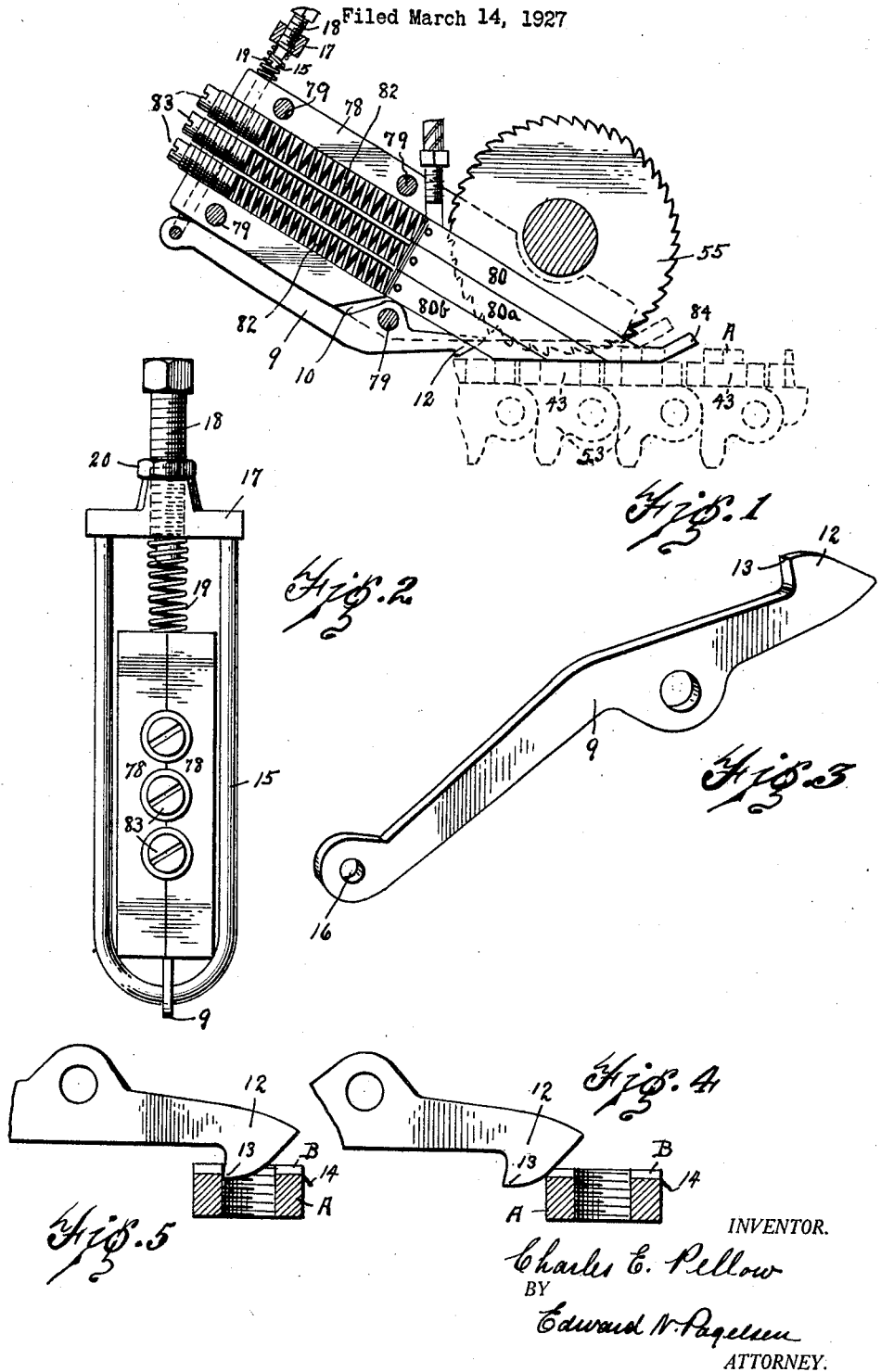

1,665,474

UNITED STATES PATENT OFFICE.

CHARLES E. PELLOW, OF DETROIT, MICHIGAN.

BURR CUTTER.

Application filed March 14, 1927. Serial No. 175,252.

This invention relates to means for removing the burrs left along the sides of nuts or other metal parts after grooves have been cut across the same, by machines having proper cutters, machines of the general character shown in my co-pending application Serial Number 741,145, filed October 2, 1924, now Patent No. 1,624,180, issued April 12, 1927, being good examples; and its object is to provide a device of this character which can be readily and cheaply applied and which will function automatically.

In the accompanying drawing, Fig. 1 is a longitudinal section of a nut retainer case constituting a part of the machine of said application, showing the retaining fingers and a burr cutter mounted therein. Fig. 2 is an end view on a larger scale of this case with the tensioning device for the burr cutter. Fig. 3 is a perspective of this burr cutter. Figs. 4 and 5 are details thereof.

Similar reference characters refer to like parts throughout the several views.

As explained in said application, a carrier chain 53, shown in dotted lines in Fig. 1 of the present drawing, supports rotatable nut carrier sockets 43 in which the nuts A are held as they pass under the saws 55 which cut diametrical grooves B across the ends of the nuts. In order to prevent the saws from throwing these nuts out of the sockets, a holding device or retainer is mounted adjacent each saw. A flat case is formed of two parts 78 secured together by means of screws 79 and constitutes a guide for three bifurcated fingers 80, 80ª and 80ᵇ, which are inclined to the carrier chain and have inclined lower ends to engage the nuts in the sockets 43.

The adjacent saw 55 extends between the sides of the fingers so that the nut receives pressure on both sides of the saw. These fingers are forced down by the springs 82 which are tensioned by the screws 83 mounted in the end of the case. The finger 80 may be formed with an inclined lip 84 which assists the nut getting under this finger.

Mounted in recesses 10 in the two halves 78 of the case and on one of the screws 79 is a lever 9 having an inclined head 12 extending into the space between the sides of the finger 80ᵇ. This head is formed with a cutting edge 13 which cuts the burrs 14 which form at the exit ends of the grooves B when these grooves are cut by the saws. As the nuts are carried along by the chain the head 12 slides in a groove and drops down at the exit end, cutting off the burr.

This cutter is tensioned by a yoke 15 which is passed through the hole 16 in the rear end of the cutter, the ends of this yoke being secured in a block 17 which is theaded for the tensioning screw 18 on which the spring 19 is mounted. The spring pressing against the case pulls up on the rear end of the burr cutter. A nut 20 may be used to lock the screw 18.

While the above description applies specifically to a castellating machine, it is evident that this burr remover may be employed in connection with any desired type of grooving mechanism.

The means for supporting this burr cutter and the proportions of the cutter may be changed by those skilled in the art without departing from the spirit of my invention as set forth in the following claims.

I claim:—

1. In a machine for cutting grooves in metal parts in which the work is carried along in engagement with cutters to permit the cutters to cut grooves across the work, a burr cutter pivotally mounted in alinement with and in the rear of the groove cutter and comprising an inclined head adapted to slide along the groove cut in the work, said head having a cutting edge adapted to cut the burr at the exit end of such groove, and means to press said head against the work.

2. In a machine for cutting grooves in metal parts in which the work is carried along in engagement with cutters to permit the cutters to cut grooves across the work, a burr cutter pivotally mounted in alinement with and in the rear of the groove cutter and comprising an inclined head adapted to slide along the groove cut in the work, said head having a cutting edge adapted to cut the burr at the exit end of such groove, and means to press said head against the work, comprising a yoke engaging the cutter and a spring to tension the cutter.

3. A burr cutter adapted to cut the burrs from the sides of work at the ends of grooves cut therein comprising a lever having a head at the front end adapted to slide in such grooves and provided with an inclined edge and a cutting edge at the rear end of said edge, a pivot for said cutter, a yoke engaging the rear end of the cutter, a spring engaging said yoke and a stationary abutment, and a screw to tension said spring.

4. A burr cutter adapted to cut the burrs from the work at the ends of grooves cut therein comprising a head adapted to slide in such grooves provided with an inclined edge and a cutting edge at the rear end of said inclined edge, and means to press said head against the work.

CHARLES E. PELLOW.